United States Patent
Qi et al.

(10) Patent No.: US 8,661,788 B2
(45) Date of Patent: Mar. 4, 2014

(54) EXHAUST AFTERTREATMENT SYSTEMS THAT INCLUDE AN AMMONIA-SCR CATALYST PROMOTED WITH AN OXYGEN STORAGE MATERIAL

(75) Inventors: Gongshin Qi, Troy, MI (US); Chang H. Kim, Rochester, MI (US); Wei Li, Troy, MI (US); Steven J. Schmieg, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 316 days.

(21) Appl. No.: 12/980,396

(22) Filed: Dec. 29, 2010

(65) Prior Publication Data

US 2012/0167553 A1 Jul. 5, 2012

(51) Int. Cl.
*F01N 3/00* (2006.01)
(52) U.S. Cl.
USPC .......... 60/285; 60/274; 60/286; 60/295; 422/171; 422/177; 502/30
(58) Field of Classification Search
USPC .......... 60/274–324; 422/171, 177; 502/30
See application file for complete search history.

(56) References Cited

U.S. PATENT DOCUMENTS

| | | | | |
|---|---|---|---|---|
| 4,199,938 | A | * | 4/1980 | Nakase et al. .............. 60/274 |
| 5,758,493 | A | * | 6/1998 | Asik et al. .............. 60/274 |
| 5,782,087 | A | * | 7/1998 | Kinugasa et al. .............. 60/276 |
| 6,345,496 | B1 | * | 2/2002 | Fuwa et al. .............. 60/274 |
| 6,708,484 | B2 | * | 3/2004 | Onodera et al. .............. 60/286 |
| 6,820,415 | B2 | * | 11/2004 | Abet et al. .............. 60/286 |
| 7,238,639 | B2 | * | 7/2007 | Mussmann et al. .............. 502/304 |
| 7,332,135 | B2 | * | 2/2008 | Gandhi et al. .............. 422/177 |
| 7,707,824 | B2 | | 5/2010 | Solbrig |
| 2002/0116920 | A1 | * | 8/2002 | Pfeifer et al. .............. 60/299 |
| 2006/0029535 | A1 | | 2/2006 | Ott |
| 2006/0052242 | A1 | | 3/2006 | Iwankuni et al. |
| 2007/0175208 | A1 | * | 8/2007 | Bandl-Konrad et al. .............. 60/286 |
| 2007/0269353 | A1 | * | 11/2007 | Li et al. .............. 422/176 |
| 2008/0167178 | A1 | * | 7/2008 | Malyala et al. .............. 502/63 |
| 2008/0279741 | A1 | * | 11/2008 | Golden et al. .............. 423/239.2 |
| 2009/0185961 | A1 | | 7/2009 | Bradshaw et al. |
| 2010/0101221 | A1 | * | 4/2010 | Charbonnel et al. .............. 60/301 |
| 2013/0202507 | A1 | * | 8/2013 | Echoff et al. .............. 423/213.5 |

FOREIGN PATENT DOCUMENTS

| | | |
|---|---|---|
| WO | 0072965 | 12/2000 |
| WO | 2009134831 | 11/2009 |

* cited by examiner

*Primary Examiner* — Thomas Denion
*Assistant Examiner* — Jesse Bogue
(74) *Attorney, Agent, or Firm* — Reising Ethington P.C.

(57) ABSTRACT

A low-oxygen content exhaust flow produced by an engine that is combusting, on average, a stoichiometric mixture of air and fuel generally contains various unwanted gaseous emissions. The exhaust flow is treated by an exhaust aftertreatment system that includes a three-way-catalyst (TWC) and an ammonia-selective catalytic reduction (ammonia-SCR) catalyst positioned downstream from the TWC in a flow direction of the exhaust flow. The ammonia-SCR catalyst includes (1) a base metal ion-substituted zeolite and/or a base metal ion-substituted silicoaluminophosphate and (2) an oxygen storage material selected from the group consisting of a metal oxide or a mixed metal oxide that exhibits oxygen storage and release capacity. The serial arrangement of the TWC and the ammonia-SCR catalyst enhances the conversion of $NO_X$ to $N_2$ in the low oxygen-content exhaust flow produced by the engine and helps prevent ammonia slip to the atmosphere.

15 Claims, 4 Drawing Sheets

EXHAUST AFTERTREATMENT SYSTEMS THAT INCLUDE AN AMMONIA-SCR CATALYST PROMOTED WITH AN OXYGEN STORAGE MATERIAL

TECHNICAL FIELD

The technical field of this disclosure relates generally to an exhaust aftertreatment system for an engine that, on average, combusts a stoichiometric mixture of air and fuel. The exhaust aftertreatment system includes a three-way-catalyst (TWC) and an ammonia-selective catalytic reduction (ammonia-SCR) catalyst positioned downstream from the TWC. The ammonia-SCR catalyst includes (1) a base metal ion-substituted zeolite and/or a base metal ion-substituted silicoaluminophosphate and (2) an oxygen storage material selected from the group consisting of a metal oxide or a mixed metal oxide that exhibits oxygen storage and release capacity. The serial arrangement of the TWC and the ammonia-SCR catalyst enhances the conversion of $NO_X$ to $N_2$ in the low oxygen-content exhaust flow produced by the engine.

BACKGROUND OF THE INVENTION

A vehicle powered by an engine that combusts a mixture of air and petrol-based fuel is customarily outfitted with an exhaust aftertreatment system to diminish the amount of unwanted gaseous emissions contained in the engine's exhaust flow. The primary emissions targeted for removal include carbon monoxide, unburned and partially burned hydrocarbons (HC's), and nitrogen oxide compounds ($NO_X$) comprised mostly of NO and $NO_2$ along with nominal amounts of $N_2O$. The concentrations of these emissions in the exhaust flow constantly fluctuate in response to compositional changes in the mixture of air and fuel fed to the engine. The rigors of stop-and-go traffic and frequent accelerations and decelerations, for example, cause the air to fuel mass ratio of the air/fuel mixture to continuously oscillate above and below a predetermined target value.

The exhaust aftertreatment system defines a contained passageway from the engine to a tailpipe opening for communication the exhaust flow away from the engine and ultimately to the atmosphere. The passageway guides the exhaust flow through one or more specially catalyzed flow-through components that are able to convert changing concentrations of the unwanted gaseous emissions into more innocuous substances. The particular architecture of the exhaust aftertreatment system and the catalysts used depends largely on the normal expected operating window of the air to fuel mass ratio of the air/fuel mixture (i.e., whether the mixture of air and fuel is stoichiometric, lean, or rich). These systems seek to oxidize carbon monoxide and HC's (to carbon dioxide and water) and to reduce $NO_X$ (to nitrogen and water).

The combustion of a mixture of air and fuel that, over time, averages a stoichiometric mass ratio of air to fuel typically produces a low-oxygen content exhaust flow that contains a desired balance of the unwanted gaseous emissions. A relatively low but not insignificant amount of carbon monoxide and HC's are present and, along with other fuel-derived compounds (i.e., hydrogen), provide reductive activity for $NO_X$ conversion. The low amount oxygen present, on the other hand, is sufficient to provide oxidative activity (along with $NO_X$) for carbon monoxide and HC oxidation but not great enough to diminish the reductive activity of those compounds. The long-standing practice to treat such an exhaust flow has been to equip the engine with an exhaust aftertreatment system that includes a catalytic converter. The catalytic converter includes a support substrate loaded with a TWC to promote intimate contact between the exhaust flow and the TWC. The reaction balance of reductants (CO, HC's, $H_2$) and oxidants ($O_2$, $NO_X$) in the exhaust flow permits the TWC to concurrently reduce $NO_X$ and oxidize carbon monoxide and HC's through various coupled catalytic reactions. A well-known example of a TWC-loaded support substrate is a monolithic honeycomb structure made from stainless steel or cordierite and washcoated with alumina and a platinum group metal fine-particle mixture (the TWC) of platinum, palladium, and rhodium.

A specific and commonly employed exhaust aftertreatment system for a stoichiometric-burn engine is a split converter configuration that employs two spaced apart catalytic converters. A first catalytic converter is mounted to the engine's exhaust manifold near the engine compartment (the close-coupled position) and a second catalytic converter is positioned downstream from the first catalytic converter and underneath the vehicle (the under-floor position). The close-coupled catalytic converter immediately receives the exhaust flow from the engine which, during cold-starts, helps quickly heat the TWC to its light-off temperature. The under-floor catalytic converter supplements the catalytic activity of the close-coupled catalytic converter during warmed-up conditions and is particularly suited to reduce $NO_X$ breakthrough when air to fuel mass ratio fluctuations are experienced in the air/fuel mixture. The split converter configuration, besides offering enhanced emission control, also generally requires less overall rhodium content to achieve effective $NO_X$ conversion when compared to system designs which utilize only a single close-coupled catalytic converter.

Some of the reductants present in the low-oxygen content exhaust flow can, however, react with $NO_X$ over the TWC in the close-coupled catalytic converter to passively generate ammonia. The detailed reaction chemistry at the catalyst surface is rather complex. But, in general, the lack of oxygen enables NO to participate in secondary alternative reactions with carbon monoxide and/or hydrogen to form ammonia according to the overall reaction equations:

$$2NO+2CO+3H_2=2NH_3+2CO_2 \tag{1}$$

$$2NO+5H_2=2NH_3+2H_2O \tag{2}$$

The extent of ammonia formation is affected by a number of engine operating parameters including, for example, the air to fuel mass ratio of the air/fuel mixture combusted in the engine, the temperature of the exhaust flow, and the exhaust flow gas hourly space velocity. A stoichiometric or rich air/fuel mixture typically results in greater amounts of ammonia being formed over the TWC than a lean air/fuel mixture. Ammonia formation over the TWC also generally peaks during engine operating conditions consistent with vehicle acceleration events.

The generation of ammonia from native $NO_X$ and exhaust reductants over the close-coupled catalytic converter may increase the likelihood of ammonia slip to the atmosphere. The placement of a PGM-based oxidation catalyst downstream from the under-floor catalytic converter to remove residual ammonia from the exhaust flow adds expense and complexity to the exhaust aftertreatment system. A continuing need therefore exists to develop methods and exhaust aftertreatment system designs that can treat the exhaust flow emitted from an engine that is combusting, on average, a stoichiometric mixture of air and fuel and, at the same time, reduce the possibility of ammonia slip to the atmosphere.

SUMMARY OF THE INVENTION

An engine that combusts a stoichiometric mixture of air and fuel generally produces a low-oxygen content exhaust flow saddled with unwanted combustion-related gaseous emissions that include carbon monoxide, HC's, and $NO_X$. The air to fuel mass ratio of the stoichiometric air/fuel mixture supplied to the engine is controlled and constantly adjusted by a computer-controlled electronic fuel injection system to range between about 14.5 and about 15.0 and achieve an average value, over time, of around 14.7 for standard gasoline fuel. The continuous cycling of the air to fuel mass ratio above and below 14.7 provokes continuous corresponding compositional variances in the exhaust flow with respect to its oxygen content and its reductant (carbon monoxide, HC's, $H_2$) content.

An exhaust aftertreatment system suited to remove these gaseous emissions includes an upstream TWC and a downstream ammonia-SCR catalyst with respect to the flow direction of the exhaust flow. The TWC and the ammonia-SCR catalyst may be serially positioned, respectively, in a contained passageway that guides the exhaust flow from the engine to a tailpipe opening. This serial arrangement of the TWC and the ammonia-SCR catalyst provides the exhaust aftertreatment system with an effective overall catalytic conversion activity and, at the same time, reduces the possibility of ammonia slip to the atmosphere.

The TWC may be located proximate to the engine's exhaust manifold in the close-coupled position and may comprise any suitable catalyst composition such as, for example, a mixture of platinum, palladium, and rhodium as very fine particles dispersed on a high surface-area support material. The ammonia-SCR catalyst may be located further downstream in the under-floor position. The downstream ammonia-SCR catalyst basically replaces all or part of the second TWC in the split converter configuration that has previously been employed for some types of engines. The ammonia-SCR catalyst may include fine particles of a base metal ion-substituted zeolite or a base metal ion-substituted silicoaluminophosphate, or both, and an oxygen storage material. Zeolites and silicoaluminophosphates each represent a broad class of open-framework, microporous, and ammonia absorbent polymorphic molecular sieve materials that can facilitate selective $NO_X$ reduction. Each of these materials is preferably ion-substituted with Cu or Fe. The oxygen storage material is a metal oxide or a mixed metal oxide that exhibits oxygen storage and release capacity. The fine particles of the base metal ion-substituted zeolite/silicoaluminophosphate and the oxygen storage material may be uniformly or non-uniformly mixed within a single washcoat layer or relegated to separate and discrete contacting washcoat layers or zones.

Many different open-framework crystal structures of the base-metal ion substituted zeolite and the base metal ion-substituted silicoaluminophosphate are suitable for use in preparing the ammonia-SCR catalyst. An exemplary and preferred listing of base metal ion-substituted zeolites that may be used include a Cu or Fe substituted β-type zeolite, Y-type zeolite, ZSM-5 zeolite, Chabazite zeolite, or USY (ultrastable Y-type) zeolite. An exemplary and preferred listing of base metal ion-substituted silicoaluminophosphates (SAPO) that may be used include a Cu or Fe substituted SAPO-5, SAPO-34, or SAPO-44. Some specific metal oxides or mixed metal oxides that may be included in the ammonia-SCR catalyst as the oxygen storage material include $CeO_2$, $Pr_6O_{11}$, $CeO_2$—$ZrO_2$, CuO—$CeO_2$, $FeO_X$—$CeO_2$ ($1.0 \leq X \leq 1.5$), $MnO_X$—$CeO_2$ ($1.0 \leq X \leq 3.5$), and $Pr_6O_{11}$—$CeO_2$. The oxygen storage and release capacity of each of these materials is thought to be attributed their crystal lattice structures and, more specifically, to the ability of their crystal lattice structures to accommodate non-stoichiometric unit cell quantities of oxygen (both higher and lower) without decomposing.

The close-coupled TWC receives the low-content exhaust flow directly from the engine's exhaust manifold and collectively converts a substantial amount of the carbon monoxide, HC's, and $NO_X$ into carbon dioxide, water, and nitrogen. The catalytic activity of the TWC is sufficient under most circumstances to decrease the concentration of these species to levels acceptable for discharge to the atmosphere. But spikes in $NO_X$ and ammonia content may occur in the exhaust flow behind the TWC. $NO_X$, for example, may slip through the TWC during lean fluctuations in the mixture of air and fuel that momentarily raise the oxygen content of the exhaust flow and reduce the amount of available reductants. Ammonia, on the other hand, may be passively generated over the TWC from native $NO_X$ during rich fluctuations in the mixture of air and fuel and/or when the engine is pressed to accelerate the vehicle.

The under-floor ammonia-SCR catalyst receives the exhaust flow after the close-coupled TWC and further reduces breakthrough $NO_X$ using passively generated ammonia from the TWC. A large proportion of the $NO_X$ that reaches the ammonia-SCR catalyst is reduced in the presence of ammonia and oxygen to produce nitrogen. The generated ammonia is absorbed by the ammonia-SCR catalyst—specifically the base metal ion-substituted zeolite particles and/or the base metal ion-substituted silicoaluminophosphate particles—where it accumulates until additional $NO_X$ arrives. The oxygen storage material included in the ammonia-SCR catalyst absorbs and accumulates oxygen from the exhaust flow in the absence of $NO_X$ and, conversely, releases oxygen when $NO_X$ is present as a result of oxygen equilibrium shifts that accompany the localized consumption of oxygen and ammonia to reduce $NO_X$.

The reversible oxygen-uptake capability of the oxygen storage material supplements the limited oxygen content of the exhaust flow and enhances the $NO_X$ conversion activity of the ammonia-SCR catalyst. The extra oxygen not only enables the overall $NO_X$ reduction reactions to proceed more easily but also promotes the oxidation of NO to $NO_2$. The oxidation of NO decreases the $NO/NO_2$ molar ratio of the $NO_X$ constituency fed to the ammonia-SCR catalyst. Such a decrease in the $NO/NO_2$ molar ratio is significant since a roughly equimolar ratio of NO to $NO_2$ is preferred for rapid reduction of $NO_X$ with ammonia.

The combined catalytic activity of the close-coupled TWC and the under-floor ammonia-SCR catalyst can continuously treat the exhaust flow across a robust variety of engine operating conditions. The ammonia-SCR catalyst is specifically suited to consume any residual $NO_X$ and ammonia that may slip past the TWC even when those two substances are not simultaneously present in the exhaust flow. Ammonia that is passively generated over the TWC and oxygen that is already present in the exhaust flow are absorbed by the ammonia-SCR catalyst when $NO_X$ is not present. The accumulation of ammonia and oxygen permits the under-floor ammonia-SCR catalyst to effectively reduce any residual $NO_X$ to nitrogen despite the scant availability of oxygen in the exhaust flow. The reaction dynamics of this ammonia catalyzed conversion of breakthrough $NO_X$ renders the exhaust aftertreatment system more tolerant to changing engine operating conditions and less expensive to implement than $NO_X$ reduction over a second downstream PGM-based TWC (the split catalytic converter configuration). The ammonia-SCR catalyst, after all, does not have to include expensive platinum group metals to function as intended.

A method for treating the exhaust flow produced by the engine includes passing the exhaust flow, first, over the close-coupled TWC and, second, over the under-floor ammonia- SCR catalyst. The mixture of air and fuel may be selectively controlled when desired to charge or replenish the ammonia-SCR catalyst with ammonia and oxygen. This can be done by combusting the mixture of air and fuel at or below stoichiometry to promote passive ammonia generation and also the most extensive $NO_X$ conversion possible over the TWC. Subsequent fluctuations in the mixture of air and fuel or other events that cause $NO_X$ to slip past the TWC can then occur without overly adverse $NO_X$-related emission repercussions. The mixture of air and fuel may likewise be selectively controlled to deplete the ammonia stored in the ammonia-SCR catalyst. This can be done by combusting the mixture of air and fuel above stoichiometry to deliver $NO_X$ to the ammonia-SCR catalyst and cease passive ammonia generation over the TWC. Although this particular method of treating the exhaust flow can achieve desirable results during the period when the mixture of air and fuel achieves, on average, a stoichiometric air to fuel mass ratio, it should be understood that momentary variations above or below this range may be executed to meet other more prioritized engine output or vehicle driving objectives that may arise.

DESCRIPTION OF PREFERRED EMBODIMENTS

Figure 1:
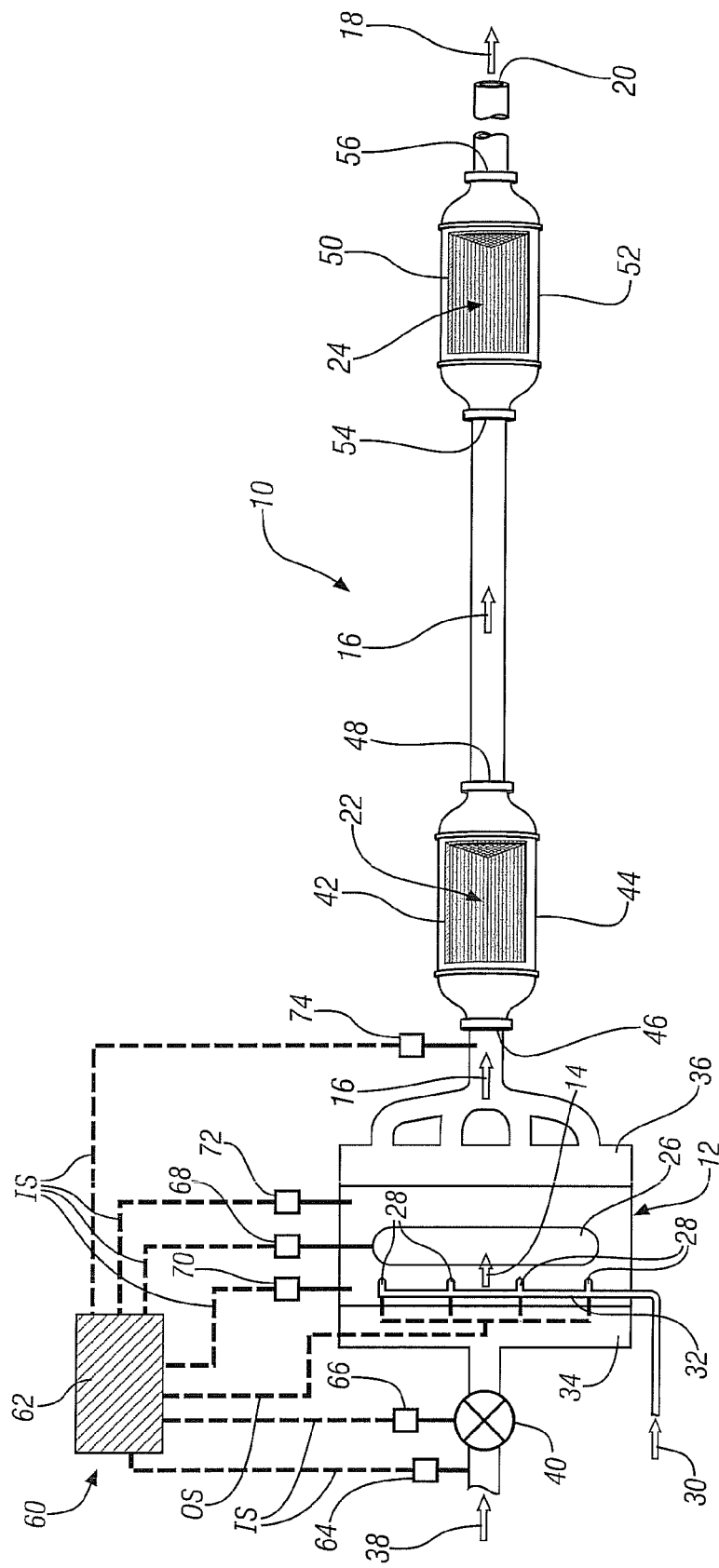
FIG. 1 is a generalized illustration of an engine and an associated exhaust aftertreatment system that is configured to treat the exhaust flow produced by the engine.

The relevant parts of an exhaust aftertreatment system 10 for a multi-cylinder reciprocating gasoline engine 12 that primarily combusts a stoichiometric mixture of air and petrol-based gasoline fuel 14 (hereafter "air/fuel mixture") are shown generally in FIG. 1. The air to fuel mass ratio of the stoichiometric air/fuel mixture 14 supplied to the engine 12 is controlled and constantly adjusted by an electronic fuel injection system 60 to oscillate between about 14.5 and about 15.0 and achieve an average value, over time, of around 14.7. The spark-ignited combustion of the air/fuel mixture 14 generates mechanical power that is harnessed to operate a vehicle (not shown) and a low oxygen-content exhaust flow 16.

The exhaust aftertreatment system 10 contains piping, joints, and other suitable flow passage and connection features that, together, define a contained passage way configured to receive the exhaust flow 16 from the engine 12 and discharge a treated exhaust flow 18 from a tailpipe opening 20. The exhaust aftertreatment system 10 includes, as shown, a close-coupled TWC 22 and an under-floor ammonia-SCR catalyst 24 that form part of the contained passageway through which the exhaust flow 16 navigates. The respective serial positioning of the TWC 22 and the ammonia-SCR catalyst 24 cooperatively decreases to acceptable levels the concentrations of various unwanted gaseous emissions originally contained in the exhaust 16 and limits the quantity of ammonia carried to the atmosphere by the treated exhaust flow 18. Other components or structural features not expressly shown, such as a muffler or resonator, may be included in the exhaust aftertreatment system 10 as understood by skilled artisans.

The multi-cylinder reciprocating gasoline engine 12 includes a plurality of cylinders 26 (usually four to eight cylinders) that accommodate reciprocating piston heads connected to a crankshaft (not shown). Each cylinder 26 defines a combustion chamber located above the piston head. The combustion chambers receive the air/fuel mixture 14 through an intake valve. The air/fuel mixture 14 is supplied to each cylinder 26 by directly and sequentially metering atomized fuel from a fuel injector 28 into the combustion chamber along with incoming air at very specifically timed intervals that correspond with actuation of the intake valve by an intake camshaft (sequential injection). A fuel flow 30 pumped from the vehicle's fuel tank supplies pressurized fuel to the fuel injectors 28 by way of a fuel rail 32. The fuel injectors 28 are positioned just behind the intake valve associated with each cylinder 26 and contain electronic solenoid valves that selectively dispense the pressurized fuel when actuated. A spark plug mounted in each cylinder 26 ignites the air/fuel mixture 14 to force downward linear movement of the piston heads to drive rotation of the crankshaft. The reactive upward movement of each piston head, a short time later, forces the combustion exhaust products out of each combustion chamber through an exhaust valve. A specific and commercially available example of the gasoline engine 12 is a spark ignition direct injection (SIDI) engine. The general operating principles and wide range of specific design choices for this type of engine are well known to skilled artisans and need not be further described here.

The engine 12 is fluidly coupled to an inlet manifold 34 and an outlet manifold 36. The inlet manifold 34 receives an air flow 38 from a throttle body valve 40 and distributes the air flow 38 to the cylinders 26 to mix with pressurized fuel and form the air/fuel mixture 14. The throttle body valve 40 may be any suitable valve, such as a butterfly valve, and is usually responsive to acceleration/deceleration demands conveyed from the vehicle's operator (i.e., by actuating a foot pedal located in the driverside compartment). The outlet manifold 36 collects the combustion exhaust products discharged from each cylinder 26 and consolidates them into the exhaust flow 16 that is delivered to the exhaust aftertreatment system 10.

The TWC 22 is mounted to the exhaust manifold 36 in the close-coupled position. The TWC 22 is carried on a flow-through support body 42 that is housed within a canister 44 that includes an inlet 46 and an outlet 48. The inlet 46 fluidly communicates directly with the exhaust manifold 36 to receive the exhaust flow 16. The outlet 48 communicates the exhaust flow 16 downstream towards the ammonia-SCR catalyst 24. The support body 42 may be a monolithic honeycomb structure that includes several hundred (400 or so) parallel flow-through channels per square inch. Each of the flow-through channels may be defined by a wall surface on which the TWC 22 is washcoated. The monolithic honeycomb structure may be formed from any material capable of withstanding the temperatures and chemical environment associated with the exhaust flow 16. Some specific examples of materials that may be used include ceramics such as extruded cordierite, silicon carbide, silicon nitride, zirconia, mullite, spodumene, alumina-silica-magnesia, zirconium silicate, sillimanite, petalite, or a heat and corrosion resistant metal such as titanium or stainless steel. The canister 44 may be formed from stainless steel and piped within the exhaust aftertreatment system 10 to facilitate continuous passage of the exhaust flow 16 across the flow-through support body 42 from the inlet 46 to the outlet 48.

The TWC 22 may comprise a combination of platinum (Pt), palladium (Pd), and rhodium (Rh) dispersed as fine particles on a high-surface area base metal oxide such as γ-alumina (γ-$Al_2O_3$) or a cerium/zirconium oxide ($CeO_2$—$ZrO_2$). The base metal oxide is present in the TWC 22 anywhere from about 70 g/L to about 150 g/L of available flow volume over the TWC 22. The Pt/Pd/Rh loading on the base metal oxide ranges from about 1 to about 7 g/L of available flow volume over the TWC 22. Several specific examples of the TWC 22 that may be used in the exhaust aftertreatment system 10 are commercially available from BASF Catalysts (Iselin, N.J.) and Johnson Matthey (London, UK).

The ammonia-SCR 24 catalyst is positioned downstream from the TWC 22 in the under-floor position. The distance between the TWC 22 and the ammonia-SCR catalyst 24 ranges from about 3 ft. to about 10 ft. The ammonia-SCR catalyst 24 is carried on a flow-through support body 50 that is housed within a canister 52 that includes an inlet 54 and an outlet 56. The inlet 54 fluidly communicates with the outlet 48 of the upstream canister 44 that houses the TWC 22 to receive the exhaust flow 16. The outlet 56 communicates the exhaust flow 16 downstream towards the tailpipe opening 20. The support body 50 may be a monolithic honeycomb structure that includes several hundred (400 or so) parallel flow-through channels per square inch. Each of the flow-through channels may be defined by a wall surface on which the ammonia-SCR catalyst 24 is washcoated. The monolithic honeycomb structure may be formed from the same materials previously mentioned. The canister 52 may be formed from stainless steel and piped within the exhaust aftertreatment system 10 to facilitate continuous passage of the exhaust flow 16 across the flow-through support body 50 from the inlet 54 to the outlet 56.

The ammonia-SCR catalyst 24 may include fine particles of (1) a base metal ion-substituted zeolite and/or a base metal ion-substituted silicoaluminophosphate and (2) an oxygen storage material. Zeolites and silicoaluminophosphates are open-framework, microporous, and ammonia absorbent polymorphic molecular sieve materials that are preferably ion-substituted with Cu or Fe. These base metal ion-substituted particles are present in the ammonia-SCR catalyst 24, in total, anywhere from about 120 g/L to about 180 g/L of available flow volume over the ammonia-SCR catalyst 24. The oxygen storage material is a metal oxide or a mixed metal oxide that exhibits oxygen storage and release capacity. The oxygen storage material is present in the ammonia-SCR catalyst 24 anywhere from about 5 g/L to about 50 g/L of available flow volume over the ammonia-SCR catalyst 24. Any suitable distribution of the particulate materials may be employed. The fine particles of the base metal ion-substituted zeolite/silicoaluminophosphate and the oxygen storage material may, for example, be uniformly mixed within a single washcoat layer or, alternatively, relegated to separate and discrete contacting washcoat layers or zones. The oxygen storage material may also be concentrated near the inlet 54 or the outlet 56 of the canister 52 that houses the ammonia-SCR catalyst 24 or in some other non-uniform distribution.

An exemplary and preferred listing of base metal ion-substituted zeolites that may be used to prepare the ammonia-SCR catalyst 24 include a Cu or Fe substituted β-type zeolite, Y-type zeolite, ZSM-5 zeolite, Chabazite zeolite, or USY (ultra-stable Y-type) zeolite. Several specific examples of these zeolite-based materials are commercially available from BASF Catalysts (Iselin, N.J.) and Johnson Matthey (London, UK). An exemplary and preferred listing of base metal ion-substituted silicoaluminophosphates (SAPO) that may be used to prepare the ammonia-SCR catalyst 24 include a Cu or Fe substituted SAPO-5, SAPO-34, or SAPO-44. These particular silicoaluminophosphates are commercially available from Novel Company (Shanghai, China). Some specific metal oxides or mixed metal oxides that may be included in the ammonia-SCR catalyst 24 as the oxygen storage material are cerium-containing and praseodymium-containing metal oxides or mixed metal oxides such as $CeO_2$, $Pr_6O_{11}$, $CeO_2$—$ZrO_2$, $CuO$—$CeO_2$, $FeO_X$—$CeO_2$ ($1.0 \leq X \leq 1.5$), $MnO_X$—$CeO_2$ ($1.0 \leq X \leq 3.5$), and $Pr_6O_{11}$—$CeO_2$. Each of these materials, without being bound by theory, are believed to have crystal lattice structures that can accommodate non-stoichiometric unit cell quantities of oxygen (both higher and lower) without decomposing. This property equates to an ability to reversibly store and release oxygen in response to the partial pressure of oxygen in the exhaust flow 16 and/or equilibrium shifts that accompany the localized consumption of oxygen during $NO_X$ reduction. The oxygen storage materials just mentioned are commercially available from Rhodia (Paris, France) or SASOL (Johannesburg, South Africa).

When the engine 12 is operating, the exhaust aftertreatment system 10 removes the various unwanted gaseous emissions from the exhaust flow 16 and limits the amount of ammonia that slips into the treated exhaust flow 18. The exhaust flow 16 passes, first, over the close-coupled TWC 22 and, second, over the under-floor ammonia-SCR catalyst 24. The combined catalytic activity of the TWC 22 and the ammonia-SCR catalyst 24 is able to continuously treat the exhaust flow 16 across a robust variety of engine operating conditions. The TWC 22 removes a substantial portion of the carbon monoxide, HC's, and $NO_X$ from the exhaust flow 16 and also passively generates ammonia to support supplemental $NO_X$ reduction at the ammonia-SCR catalyst 24. Any $NO_X$ that escapes past the TWC 22 is consumed at the ammonia-SCR catalyst 24 along with some or all of the ammonia supplied from the TWC 22 to keep $NO_X$ concentrations in the treated exhaust flow very low.

The air/fuel mixture 14 supplied to the engine 12, as already noted, is constantly adjusted by the electronic fuel injection system 60 to achieve, on average, an air to fuel mass ratio of about 14.7. The combustion of the air/fuel mixture 14 in the engine's cylinders 26 provides the exhaust flow 16 with a relatively large amount of nitrogen (>70 vol. %.), a small amount of oxygen, and unwanted gaseous emissions comprised of carbon monoxide, HC's, and $NO_X$. The amount of oxygen present is generally less than about 2.0 vol. %. The amount of carbon monoxide, HC's and $NO_X$ present is typically about 0.8 vol. % or less, about 800 ppmv or less, and about 1500 ppmv or less, respectively. The $NO_X$ constituency of the exhaust flow 16 generally includes a large molar proportion of NO (greater than 90 mol %).

The instantaneous air to fuel mass ratio of the air/fuel mixture 14, however, may oscillate between about 14.5 and about 15.0 in response to abrupt fluctuations in the engine's 12 operating conditions. These oscillations cause the chemical composition of the exhaust flow 16 to vary within the limits mentioned above. A lower air to fuel mass ratio (14.5-14.7) typically results in higher concentrations of carbon monoxide, HC's, and $NO_X$ and a lower concentration of oxygen when compared to a higher air to fuel mass ratio (14.8-15.0). Passive ammonia generation from native $NO_X$ over the TWC 22 is also more easily promoted at an air to fuel mass ratio of about 14.7 and lower.

The electronic fuel injection system 60 shown here is a closed-looped control strategy that utilizes an electronic control module (ECM) 62 to monitor and dynamically control the air to fuel mass ratio of the air/fuel mixture 14. The ECM 62 includes a microprocessor or a microcontroller, a memory capacity that stores pre-programmed look-up tables and software, and related circuitry to receive data and send command signals. The ECM 62, for example, as shown here, continuously receives input signals IS from an air mass flow sensor 64, a throttle body valve position sensor 66, an engine coolant temperature sensor 68, an intake camshaft position sensor 70, a crankshaft position sensor 72, and an exhaust oxygen sensor 74. The interrelated data transmitted by these sensors 64, 66, 68, 70, 72, 74 during operation of the engine 12 allows the ECM 62 to reference one or more look-up tables and/or execute an algorithm to calculate precisely how much fuel needs to be instantaneously delivered to each sequentially-fired cylinder 26 to maintain the desired air to fuel mass ratio in the air/fuel mixture 14. The ECM 62, after such making such calculations, sends corresponding output signals OS independently to each fuel injector 28. These output signals OS open the electronic solenoid valve of each fuel injector 28 for a predetermined and specific duration (pulse width) to meter the calculated amount of atomized fuel into the respective cylinders 26 just prior to ignition. The ECM 62 performs these calculations for every fuel injection event and, as such, can quickly react to changing engine operating conditions as identified by the real-time feedback provided from the various sensors 64, 66, 68, 70, 72, 74.

The close-coupled TWC 22 receives the exhaust flow 16 from the exhaust manifold 36. The TWC 22 oxidizes most of the CO (to $CO_2$) and HC's (to $CO_2$ and $H_2O$) regardless of the chemical composition of the exhaust flow 16. The $NO_X$ conversion activity of the TWC 22 is not as consistent. When the air/fuel mixture 14 momentarily drops below 14.7, for instance, the TWC 22 reduces $NO_X$ (to $N_2$ and $H_2O$) and also promotes a less prevalent secondary reaction in which $NO_X$, hydrogen, and carbon monoxide react in the absence of oxygen to form ammonia. This secondary reaction feeds the under-floor ammonia-SCR catalyst 24 with enough ammonia to drive a supplemental catalytic $NO_X$ reduction reaction when $NO_X$ is contained in the exhaust flow 16. When the air/fuel mixture 14 momentarily rises above 14.7, on the other hand, the TWC 22 passively generates very little ammonia, if any, and has a tendency to allow $NO_X$ to escape downstream unreacted.

The under-floor ammonia-SCR catalyst 24 receives the exhaust flow 16 from the close-coupled TWC 22. The ammonia-SCR catalyst 24 facilitates the catalytic reduction of $NO_X$ behind the TWC 22 and continuously consumes both ammonia and $NO_X$ even when those two substances are not simultaneously present in the exhaust flow 16. The ammonia that is passively generated over the TWC 22, for instance, is mostly absorbed by the ammonia-SCR catalyst 24. The absorbed ammonia accumulates at the ammonia-SCR catalyst 24 until a sufficient quantity of $NO_X$ becomes available. Any number of events may slightly diminish the $NO_X$ conversion efficiency of the close-coupled TWC 22 and permit $NO_X$ to reach the ammonia-SCR catalyst 24 by way of the exhaust flow 16. The $NO_X$ that breaks through the TWC 22 is reduced by the ammonia stored at the ammonia-SCR catalyst 24. The ability of the ammonia-SCR catalyst 24 to accommodate variances in the chemical composition of the exhaust flow 16 and out-of-phase concentration spikes in $NO_X$ and ammonia helps limit the escape of these two substances into the treated exhaust flow 18.

The oxygen storage material included in the ammonia-SCR catalyst 24 provides a reserve oxygen supply that enhances the catalytic reduction reaction between ammonia and $NO_X$. The oxygen storage material absorbs oxygen from the low-oxygen content exhaust flow 16 when $NO_X$ is not present. The accumulated oxygen is then extracted to supplement the sparingly available oxygen in the exhaust flow 16 when $NO_X$ arrives at the ammonia-SCR catalyst 24 in response to oxygen equilibrium shifts that accompany the localized consumption of oxygen to reduce $NO_X$. This influx of reserve oxygen achieves $NO_X$ reduction efficiency gains in several ways. First, the extra oxygen improves the overall reaction kinetics of the $NO_X$ reduction reactions (both NO and $NO_2$) since oxygen scarcity can have a rate-limiting effect. Second, the extra oxygen promotes the oxidation of NO to $NO_2$. This oxidation reaction decreases the NO to $NO_2$ molar ratio of the $NO_X$ fed to the ammonia-SCR catalyst 24. Such an adjustment is desirable since the overall reduction of $NO_X$ generally proceeds more efficiently when the $NO/NO_2$ molar ratio is decreased from that originally produced by the engine 12 to, preferably, about 1.0 (equimolar).

The air/fuel mixture 14 may be managed by the electronic fuel injection system 60 to control the amount of passively generated ammonia supplied to the ammonia-SCR catalyst 24. The air/fuel mixture 14 may, for example, during the early stages of engine operation, be kept below 14.7 to charge the ammonia-SCR catalyst 24 with ammonia and oxygen. A specific example of an electronic control strategy that may be implemented to control the generation of ammonia over the close-coupled TWC 22 is disclosed in commonly owned U.S. Patent Application Publication 2010/0043402 to Perry et al. The possibility that $NO_X$ would escape past the TWC 22 while the air/fuel mixture 14 is maintained at values consistent with passive ammonia generation is quite low. Then, to achieve more efficient fuel economy, the air/fuel mixture 14 may be maintained slightly above 14.7 for a brief or prolonged duration. This slight departure from stoichiometry impedes passive ammonia generation and also increases the likelihood of $NO_X$ escape past the TWC 22. The air/fuel mixture 14 may be kept slightly above stoichiometry as long as there is sufficient ammonia and oxygen available at the ammonia-SCR catalyst 24 to reduce $NO_X$ to $N_2$. The ammonia reserve may last for a few minutes or much longer based on the current operating dynamics of the engine 12. The air/fuel mixture 14 may eventually be shifted back to stoichiometric or below to replenish the ammonia-SCR catalyst 24 with passively generated ammonia.

EXAMPLES

The following Examples demonstrate the enhanced $NO_X$ catalytic activity and durability of several ammonia-SCR catalysts that were promoted with oxygen storage materials. The ammonia-SCR catalysts were commercially available and fabricated mainly from base metal ion-substituted zeolites.

FIGS. 2-7 illustrate the impact the oxygen storage materials had on the $NO_X$ conversion activity of the commercially available ammonia-SCR catalysts. The ammonia-SCR catalysts were washcoated, with and without the oxygen storage material, onto monolithic honeycomb core samples and housed within a laboratory reactor configured to flow a variable-composition gas stream, at 350° C., over the catalysts. The variable-composition gas stream consistently contained nitrogen, carbon dioxide, and hydrogen and was alternately supplied with (1) NO and oxygen and (2) ammonia. The alternating supply of NO and oxygen/ammonia, although not necessarily representative of an engine exhaust flow, was nonetheless sufficient to gain an understanding of how the catalysts would likely function when positioned downstream from a TWC and exposed to the exhaust flow emanated from an engine that is combusting, on average, a stoichiometric mixture of air and fuel. The catalysts were evaluated with and without the addition of the oxygen storage material to provide a measure of comparison.

Figure 2:
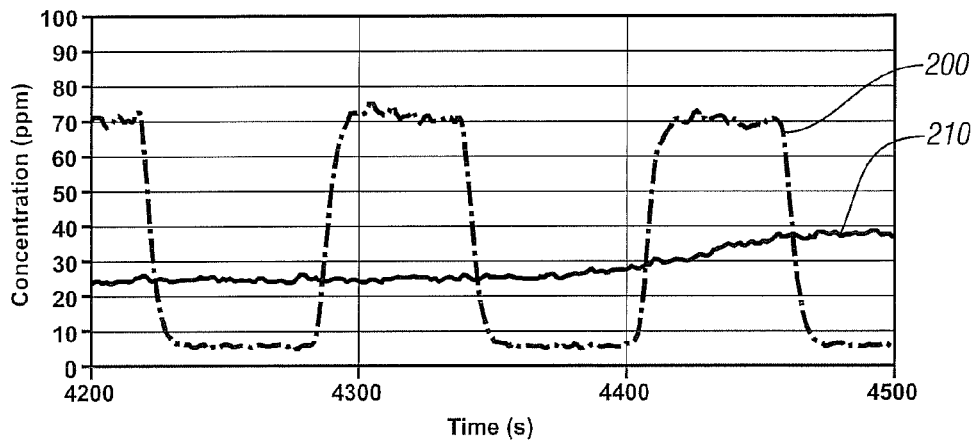
FIG. 2 is a graph that plots the concentration (ppm) of NO (identified as numeral 200) and ammonia (identified as numeral 210) emerging from a commercially available iron substituted ammonia-SCR catalyst as a function of time (s). The ammonia-SCR catalyst was subjected to an alternating rich/lean gas flow at a temperature of 350° C. to measure the extent of NO conversion.
Figure 3:
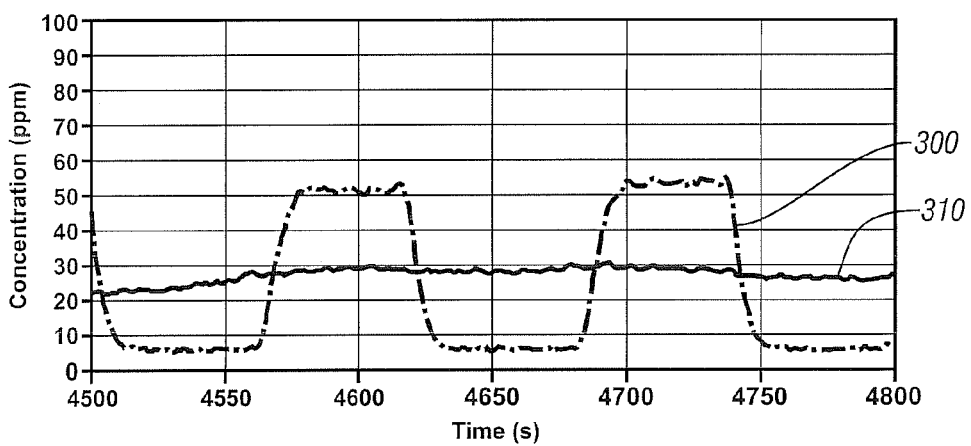
FIG. 3 is a graph that plots the concentration (ppm) of NO (identified as 300) and ammonia (identified as 310) emerging from a commercially available iron substituted ammonia-SCR catalyst that includes an oxygen storage material as a function of time time (s). The ammonia-SCR catalyst was subjected to an alternating rich/lean gas flow at a temperature of 350° C. to measure the extent of NO conversion. The effect the oxygen storage material had on NO conversion can be seen by comparing FIGS. 2 and 3.

FIGS. 2 and 3 show the NO conversion of an iron substituted ammonia-SCR catalyst without an oxygen storage material and an iron substituted ammonia-SCR catalyst with an oxygen storage material, respectively. A first monolithic honeycomb core sample was washcoated with the iron substituted ammonia SCR-catalyst. A second monolithic honeycomb core sample was washcoated with a uniform mixture of the iron substituted ammonia-SCR catalyst and the oxygen storage material. The total amount of the oxygen storage material present was about 30 g/L of available flow volume over the catalyst. The iron substituted ammonia-SCR catalyst used for each core sample was obtained from a commercial supplier. The oxygen storage material used to prepare the second core sample was $CeO_2$—$ZrO_2$ (72/28 wt. % $CeO_2$/$ZrO_2$).

Each of the first and second monolithic honeycomb core samples was then placed in the reactor and exposed to the variable-composition gas stream. The variable-composition gas stream cycled between a so-called "lean state" and a so-called "rich state." The lean state comprised approximately 10 vol. % $CO_2$, 10 vol. % $H_2O$, 100 ppmv NO, 1000 ppmv $O_2$, and the balance $N_2$. The rich state comprised approximately 10 vol. % $CO_2$, 10 vol. % $H_2O$, 100 ppmv $NH_3$, and the balance $N_2$. The cycling of the variable-composition gas stream occurred in 1 minute intervals (1 min. lean/1 min. rich/1 min. lean/etc.). The concentrations of both NO and ammonia were measured just downstream of the monolithic honeycomb core samples. The concentration of NO is identified by numeral 200 in FIGS. 2 and 300 in FIG. 3. The concentration of ammonia is identified by numeral 210 in FIGS. 2 and 310 in FIG. 3.

A comparison of FIG. 2 (without the oxygen storage material) and FIG. 3 (with the oxygen storage material) reveals the oxygen storage material contributed to a roughly 20% increase in NO conversion.

Figure 4:
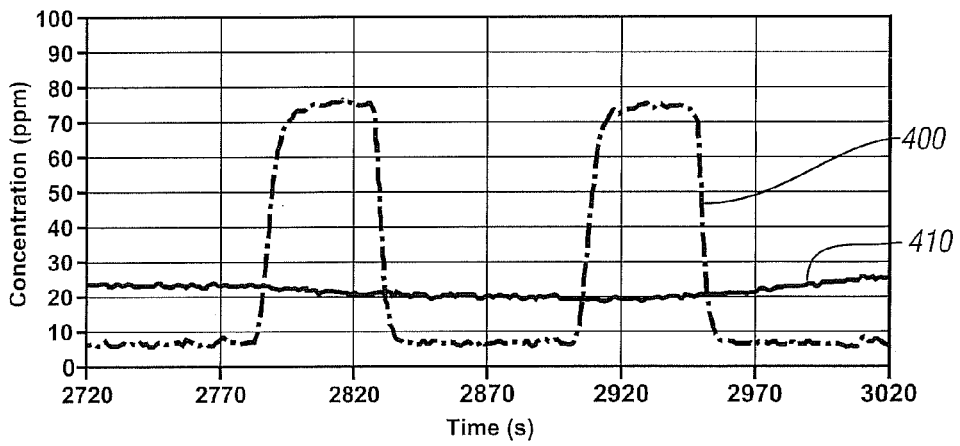
FIG. 4 is a graph that plots the concentration (ppm) of NO (identified as 400) and ammonia (identified as 410) emerging from a commercially available copper substituted ammonia-SCR catalyst as a function of time (s). The ammonia-SCR catalyst was subjected to an alternating rich/lean gas flow to measure the extent of NO conversion.
Figure 5:
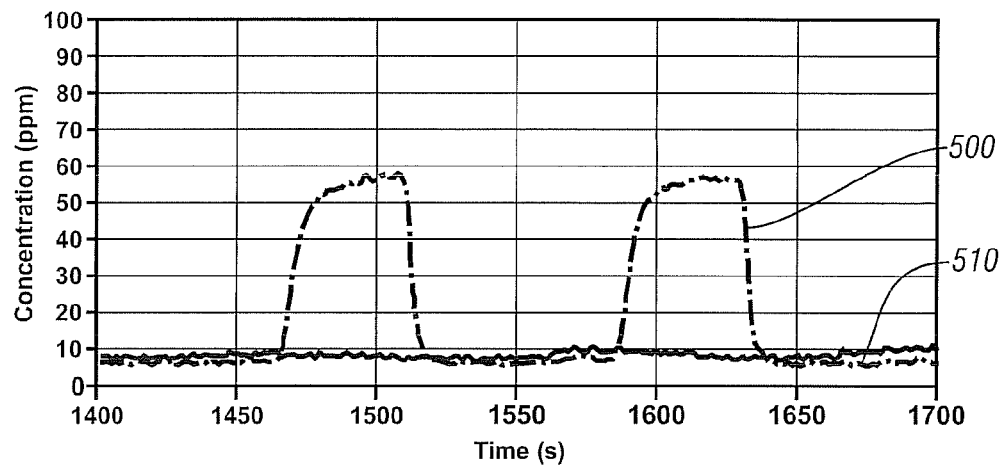
FIG. 5 is a graph that plots the concentration (ppm) of NO (identified as 500) and ammonia (identified as 510) emerging from a commercially available copper substituted ammonia-SCR catalyst that includes an oxygen storage material as a function of time (s). The ammonia-SCR catalyst was subjected to an alternating rich/lean gas flow to measure the extent of NO conversion. The effect the oxygen storage material had on NO conversion can be seen by comparing FIGS. 4 and 5.

FIGS. 4 and 5 show the NO conversion of a copper substituted ammonia-SCR catalyst without an oxygen storage material and a copper substituted ammonia-SCR catalyst with an oxygen storage material, respectively. A first monolithic honeycomb core sample was washcoated with the copper substituted ammonia SCR-catalyst. A second monolithic honeycomb core sample was washcoated with a uniform mixture of the copper substituted ammonia-SCR catalyst and the oxygen storage material. The total amount of the oxygen storage material present was about 30 g/L of available flow volume over the catalyst. The copper substituted ammonia-SCR catalyst used for each core sample was obtained from a commercial supplier. The oxygen storage material used to prepare the second core sample was $CeO_2$—$ZrO_2$ (72/28 wt. % $CeO_2/ZrO_2$).

Each of the first and second monolithic honeycomb core samples was then placed in the reactor and exposed to the variable-composition gas stream. The variable-composition gas stream was the same as indicated for FIGS. 2-3 except that 500 ppmv $O_2$ was used for the lean state instead of 1000 ppmv $O_2$. The concentrations of both NO and ammonia were measured just downstream of the monolithic honeycomb core samples. The concentration of NO is identified by numeral 400 in FIGS. 4 and 500 in FIG. 5. The concentration of ammonia is identified by numeral 410 in FIGS. 4 and 510 in FIG. 5.

A comparison of FIG. 4 (without the oxygen storage material) and FIG. 5 (with the oxygen storage material) reveals the oxygen storage material contributed to a roughly 20% increase in NO conversion. The decrease in $O_2$ concentration during the lean state from 1000 ppmv to 500 ppmv appears to have slightly reduced the overall NO conversion in both core samples. This slight reduction in NO conversion provides some insight into the potential rate-limiting effect of oxygen on $NO_X$ conversion over an ammonia-SCR catalyst.

Figure 6:
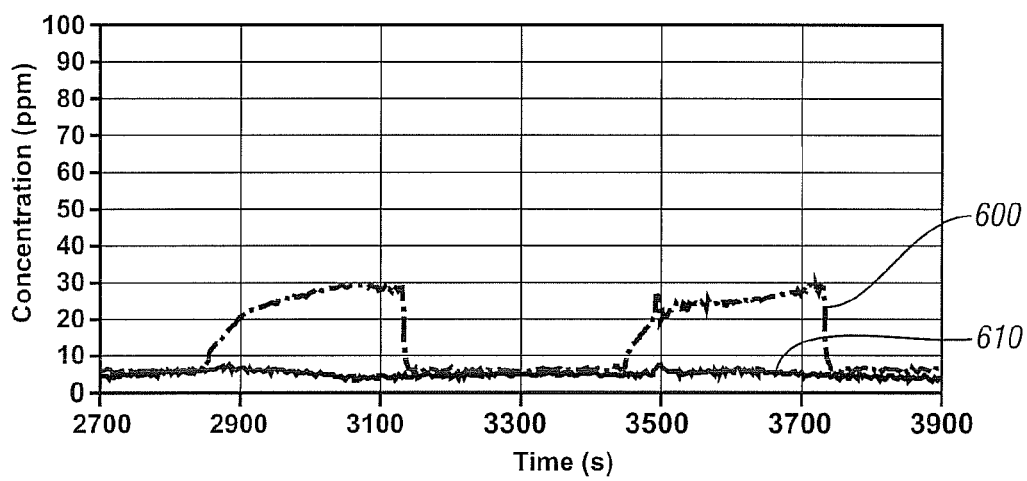
FIG. 6 is a graph that plots the concentration (ppm) of NO (identified as 600) and ammonia (identified as 610) emerging from a commercially available copper substituted ammonia-SCR catalyst as a function of time (s). The ammonia-SCR catalyst was subjected to an alternating rich/lean gas flow to measure the extent of NO conversion. The alternating rich/lean intervals of the gas flow were maintained for longer periods here than in FIG. 4.
Figure 7:
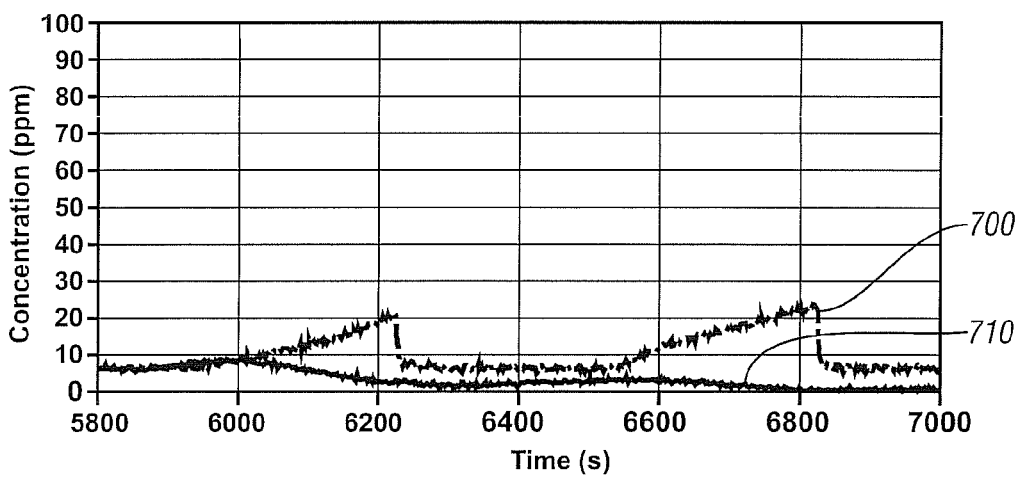
FIG. 7 is a graph that plots the concentration (ppm) of NO (identified as 700) and ammonia (identified as 710) emerging from a commercially available copper substituted ammonia-SCR catalyst that includes an oxygen storage material as a function of time (s). The ammonia-SCR catalyst was subjected to an alternating rich/lean gas flow to measure the extent of NO conversion. The alternating rich/lean intervals of the gas flow were maintained for longer periods here than in FIG. 5. The effect the oxygen storage material had on NO conversion can be seen by comparing FIGS. 6 and 7.

FIGS. 6 and 7 show the NO conversion of a copper substituted ammonia-SCR catalyst without an oxygen storage material and a copper substituted ammonia-SCR catalyst with an oxygen storage material, respectively. A first monolithic honeycomb core sample was washcoated with the copper substituted ammonia SCR-catalyst. A second monolithic honeycomb core sample was washcoated with a uniform mixture of the copper substituted ammonia-SCR catalyst and the oxygen storage material. The total amount of the oxygen storage material present was about 30 g/L of available flow volume over the catalyst. The copper substituted ammonia-SCR catalyst used for each core sample was obtained from a commercial supplier. The oxygen storage material used to prepare the second core sample was $CeO_2$—$ZrO_2$ (72/28 wt. % $CeO_2/ZrO_2$).

Each of the first and second monolithic honeycomb core samples was then placed in the reactor and exposed to the variable-composition gas stream. The variable-composition gas stream was the same as indicated for FIGS. 4-5 except that cycling occurred in 5 minute intervals (5 min. lean/5 min. rich/5 min. lean/etc.). The concentrations of both NO and ammonia were measured just downstream of the monolithic honeycomb core samples. The concentration of NO is identified by numeral 600 in FIGS. 6 and 700 in FIG. 7. The concentration of ammonia is identified by numeral 610 in FIGS. 6 and 710 in FIG. 7.

A comparison of FIG. 6 (without the oxygen storage material) and FIG. 7 (with the oxygen storage material) reveals the oxygen storage material contributed to a roughly 15% increase in NO conversion. The increase in cycling intervals from 1 minute to 5 minutes appears to have increased the overall NO conversion in both core samples. This increase in cycling indicates that longer and less frequent oxygen exposure times may, in some instances, be preferred over shorter but more frequent oxygen exposure intervals for effective $NO_X$-conversion.

Figure 8:
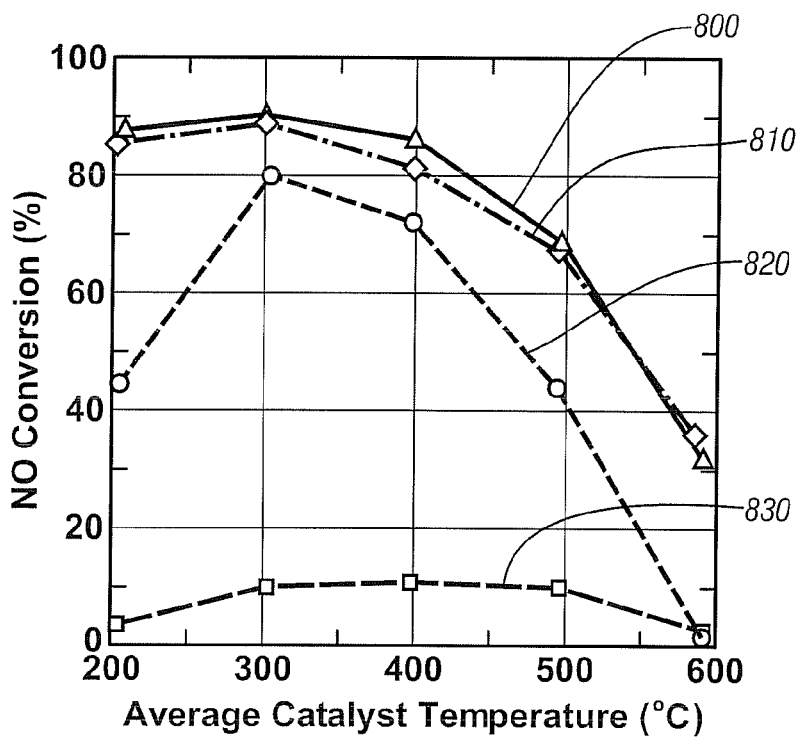
FIG. 8 is a graph that plots $NO_X$ conversion (%) versus average catalyst temperature (° C.) for several commercially available copper substituted ammonia-SCR catalysts (identified by numerals 800-830). Each ammonia-SCR catalyst was aged differently and subjected to a lean gas flow in an attempt to analyze hydrothermal durability.
Figure 9:
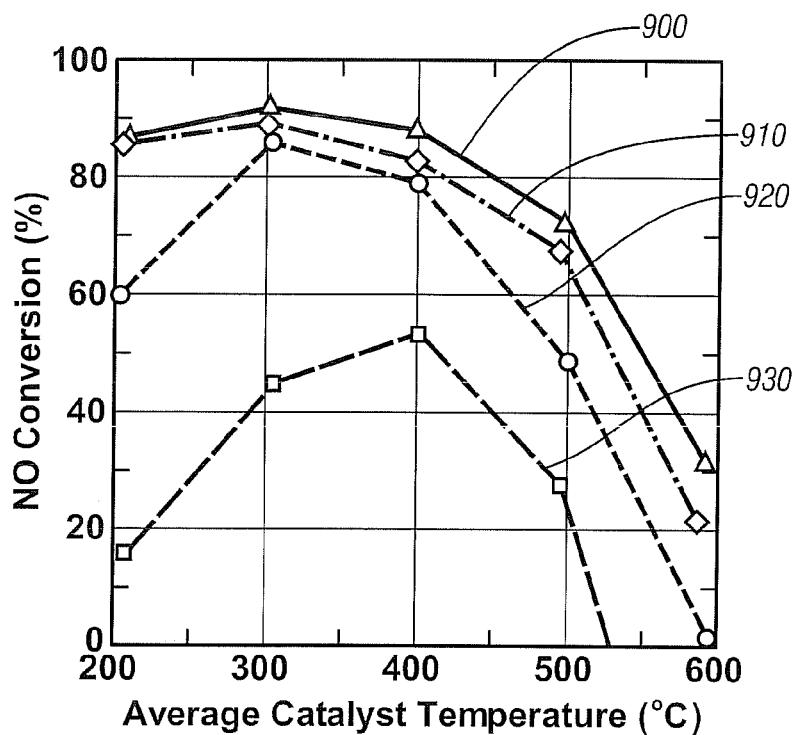
FIG. 9 is a graph that plots the $NO_X$ conversion (%) versus average catalyst temperature (° C.) for several commercially available copper substituted ammonia-SCR catalysts that include an oxygen storage material (identified by numerals 900-930). Each ammonia-SCR catalyst was aged differently and subjected to the same lean gas flow as before (FIG. 8). The effect the oxygen storage material had on hydrothermal durability can be seen by comparing the differences in $NO_X$ conversion between FIGS. 8 and 9.

FIGS. 8-9 illustrate the effects the oxygen storage material had on the hydrothermal durability of the copper substituted ammonia-SCR catalyst used before (FIGS. 4-7). The copper substituted ammonia-SCR catalysts were washcoated onto monolithic honeycomb core samples and oven aged to different extents. The core samples were then housed within a laboratory reactor configured to flow a fixed-composition gas stream over the catalysts at increasing temperatures. The fixed-composition gas stream comprised approximately 10 vol. % $O_2$, 5 vol. % $H_2O$, 8 vol. % $CO_2$, 200 ppmv NO, 180 ppmv $NH_3$, and the balance $N_2$. The copper substituted ammonia-SCR catalysts were evaluated with and without the addition of the oxygen storage material to provide a measure of comparison.

FIG. 8 shows the NO conversion of four differently aged copper substituted ammonia-SCR catalysts without an oxygen storage material. The first catalyst was aged for 5 hours at 550° C. and is identified by numeral 800. The second catalyst was aged for 50 hours at 750° C. and is identified by numeral 810. The third catalyst was aged for 16 hours at 875° C. and is identified by numeral 820. The fourth catalyst was aged for 24 hours at 875° C. and is identified by numeral 830. FIG. 9 shows the NO conversion of those same catalysts with an oxygen storage material. The catalysts are identified by numerals 900, 910, 920, and 930 with like numerals (i.e, 800 and 900) corresponding to the same ageing conditions just described. The total amount of the oxygen storage material present in each catalyst was about 30 g/L of available flow volume over the catalyst. The oxygen storage material employed was $CeO_2$—$ZrO_2$ (72/28 wt. % $CeO_2/ZrO_2$).

A comparison of FIG. 8 (without the oxygen storage material) and FIG. 9 (with the oxygen storage material) reveals the oxygen storage material did not adversely affect the hydrothermal durability of the commercially available copper substituted ammonia-SCR catalyst. The durability of the lower temperature-aged catalysts (800/900 and 810/910) was practically the same. The only observed difference was a small decrease in NO conversion after about 550° C. for the more-aged ammonia-SCR catalyst that included the oxygen storage material (910). As for the higher temperature-aged catalysts (820/920 and 830/930), the oxygen storage material actually improved hydrothermal durability at temperatures up to slightly above 500° C. This increase in hydrothermal durability is significant since it occurs over a temperature range that encompasses the normal average catalyst temperature at the under-floor position.

The above description of exemplary embodiments and specific examples are merely descriptive in nature and not intended to limit the scope of the claims that follow.

The invention claimed is:

1. A method for treating an exhaust flow from an engine that is combusting a stoichiometric mixture of air and fuel, the method comprising:
   supplying a plurality of cylinders of a multi-cylinder reciprocating spark-ignited engine with a mixture of air and fuel defined by an air to fuel mass ratio that averages, over time, to about stoichiometry;
   combusting the mixture of air and fuel in the cylinders to produce a low-oxygen content exhaust flow that comprises carbon monoxide, unburned and partially burned hydrocarbons, and $NO_X$;
   passing the exhaust flow over a close-coupled three-way-catalyst that catalytically oxidizes carbon monoxide and unburned and partially burned hydrocarbons, reduces $NO_X$, and passively generates ammonia from $NO_X$; and
   passing the exhaust flow over an ammonia-selective catalytic reduction catalyst positioned downstream from the close-coupled three-way-catalyst, relative to a flow direction of the exhaust flow, to catalytically reduce $NO_X$ that escapes past the close-coupled three-way-catalyst in the presence of oxygen and ammonia, the ammonia-selective catalytic reduction catalyst comprising (1) fine particles of at least one of a base metal ion-substituted zeolite or a base metal ion-substituted silicoaluminophosphate and (2) an oxygen storage material selected from the group consisting of $CeO_2$, $Pr_6O_{11}$, $CeO_2$—$ZrO_2$, $CuO$—$CeO_2$, $FeO_X$—$CeO_2$, $MnO_X$—$CeO_2$, $Pr_6O_{11}$—$CeO_2$ and mixtures thereof.

2. The method of claim 1, wherein the oxygen storage material is present in the ammonia-selective catalytic reduction catalyst in an amount that ranges from about 5 to about 50 grams per liter of available flow volume over the ammonia-selective catalytic reduction catalyst.

3. The method of claim 1, wherein the base metal ion-substituted zeolite comprises a Cu or Fe substituted β-type zeolite, Y-type zeolite, ZSM-5 zeolite, Chabazite zeolite, or USY (ultra-stable Y-type) zeolite.

4. The method of claim 1, wherein the base metal ion-substituted silicoaluminophosphate is substituted with Cu or Fe.

5. The method of claim 1, wherein the ammonia-selective catalytic reduction catalyst is positioned about 3 ft. to about 10 ft. downstream from the close-coupled three-way-catalyst.

6. The method of claim 1, wherein supplying the cylinders with a mixture of air and fuel comprises:
   supplying a mixture of air and fuel defined by an air to fuel mass ratio that fluctuates between about 14.5 and about 15.0 and averages, over time, to about 14.7;
   selectively maintaining the air to fuel mass ratio between about 14.5 and about 14.7 for a predetermined time duration to passively generate ammonia over the close-coupled three-way-catalyst and to accumulate ammonia at the ammonia-selective catalytic reduction catalyst; and, alternately selectively maintaining the air to fuel mass ratio between about 14.8 and about 15.0 for a predetermined time duration to deliver enough $NO_X$ to the ammonia-selective catalytic reduction catalyst to deplete ammonia that accumulated at the ammonia-selective catalytic reduction catalyst.

7. The method of claim 1, wherein the close-coupled three-way-catalyst comprises a mixture of platinum, palladium, and rhodium as fine particles dispersed on a base metal oxide.

8. A method for treating an exhaust flow from an engine that is combusting a stoichiometric mixture of air and fuel, the method comprising:

supplying a plurality of cylinders of a multi-cylinder reciprocating spark-ignited engine with a mixture of air and fuel defined by an air to fuel mass ratio that fluctuates between about 14.5 to about 15.0 and averages, over time, to about 14.7, the mutli-cylinder reciprocating spark-ignited engine being fluidly coupled to an outlet manifold;

combusting a mixture of air and fuel in the cylinders to produce a low-oxygen content exhaust flow that comprises carbon monoxide, unburned and partially burned hydrocarbons, and $NO_X$;

delivering the low-oxygen content exhaust flow to an exhaust aftertreatment system that defines a contained passageway from the outlet manifold to a tailpipe opening, the exhaust aftertreatment system comprising a three-way-catalyst and an ammonia-selective catalytic reduction catalyst positioned downstream from the three-way-catalyst relative to a flow direction of the low oxygen-content exhaust flow, the ammonia-selective catalytic reduction catalyst comprising (1) at least one of a base metal ion-substituted zeolite or a base metal ion-substituted silicoaluminophosphate and (2) an oxygen storage material comprised of a metal oxide or a mixed metal oxide that exhibits oxygen storage and release capacity;

passing the low-oxygen content exhaust flow through the exhaust aftertreatment system when the air to fuel mass ratio of the mixture of air and fuel being combusted is 14.7 or below to (1) catalytically oxidize carbon monoxide and unburned and partially burned hydrocarbons over the three-way-catalyst, (2) passively generate ammonia from $NO_X$ over the three-way-catalyst, and (3) accumulate the ammonia generated over the three-way-catalyst at the ammonia-selective catalytic reduction catalyst;

passing the low-oxygen content exhaust flow through the exhaust aftertreatment system when the air to fuel mass ratio of the mixture of air and fuel being combusted is 14.8 and above to (1) catalytically oxidize carbon monoxide and unburned and partially burned hydrocarbons over the three-way-catalyst and (2) deliver $NO_X$ to the ammonia-selective catalytic reduction catalyst to catalytically react with ammonia that accumulated at the ammonia-selective catalytic reduction catalyst and oxygen to form nitrogen; and selectively controlling the air to fuel mass ratio of the mixture of air and fuel supplied to the cylinders of the multi-cylinder reciprocating spark-ignited engine to accumulate or deplete ammonia at the ammonia-selective catalytic reduction catalyst.

9. The method of claim 8, wherein the base metal ion-substituted zeolite comprises a Cu or Fe substituted β-type zeolite, Y-type zeolite, ZSM-5 zeolite, Chabazite zeolite, or USY (ultra-stable Y-type) zeolite.

10. The method of claim 8, wherein the base metal ion-substituted silicoaluminophosphate is substituted with Cu or Fe.

11. The method of claim 8, wherein the oxygen storage material comprises at least one of a cerium-containing or a praseodymium-containing metal oxide or mixed metal oxide.

12. The method of claim 11, wherein the oxygen storage material is selected from the group consisting of $CeO_2$, $Pr_6O_{11}$, $CeO_2$—$ZrO_2$, CuO—$CeO_2$, $FeO_X$—$CeO_2$, $MnO_X$—$CeO_2$, $Pr_6O_{11}$—$CeO_2$, and mixtures thereof.

13. The method of claim 11, wherein the oxygen storage material is present in the ammonia-selective catalytic reduction catalyst in an amount that ranges from about 5 to about 50 grams per liter of available flow volume over the ammonia-selective catalytic reduction catalyst.

14. The method of claim 8, wherein the three-way-catalyst comprises a mixture of platinum, palladium, and rhodium as fine particles dispersed on a base metal oxide.

15. A system for treating an exhaust flow from an engine that is combusting a stoichiometric mixture of air and fuel, the system comprising:

a multi-cylinder reciprocating spark-ignited engine that comprises a plurality of cylinders, the multi-cylinder reciprocating spark-ignited engine being fluidly coupled to an inlet manifold and an outlet manifold;

an electronic fuel injection system that meters a precise amount of fuel into the cylinders to mix with a flow of air from the inlet manifold to form a mixture of air and fuel defined by an air to fuel mass ratio that fluctuates between about 14.5 and 15.0 and averages, over time, to about 14.7;

a close-coupled three-way-catalyst housed in a canister attached directly to the exhaust manifold, the three-way-catalyst being able to catalytically oxidize carbon monoxide and unburned and partially burned hydrocarbons, reduce $NO_X$, and passively generate ammonia from $NO_X$ as the air to fuel mass ratio fluctuates; and an ammonia-selective catalytic reduction catalyst housed in a canister positioned downstream from the three-way-catalyst with respect to a flow direction of the exhaust flow, the ammonia-selective catalytic reduction catalyst comprising (1) at least one of a base metal ion-substituted zeolite or a base metal ion-substituted silicoaluminophosphate and (2) an oxygen storage material selected from the group consisting of $CeO_2$, $Pr_6O_{11}$, $CeO_2$—$ZrO_2$, CuO—$CeO_2$, $FeOx$-$CeO_2$, $MnOx$-$CeO_2$, $Pr_6O_{11}$—$CeO_2$, and mixtures thereof.

* * * * *